United States Patent [19]

Marshall

[11] 3,958,220
[45] May 18, 1976

[54] ENHANCED ERROR CORRECTION

[75] Inventor: John William Marshall, Boulder, Colo.

[73] Assignee: International Business Machines Corporation, Armonk, N.Y.

[22] Filed: May 30, 1975

[21] Appl. No.: 582,516

[52] U.S. Cl. .................................. 340/146.1 AL
[51] Int. Cl.² .......................................... G06F 11/12
[58] Field of Search ........ 340/146..1 AL, 146.1 AV, 340/172.5

[56] References Cited
UNITED STATES PATENTS

| ,697,948 | 10/1972 | Bossen | 340/146.1 AL |
| ,725,859 | 4/1973 | Blair et al. | 340/146.1 AL |
| ,745,525 | 7/1973 | Hong et al. | 340/146.1 AL |
| ,836,957 | 9/1974 | Duke et al. | 340/146.1 AL |
| ,851,306 | 11/1974 | Patel | 340/146.1 AL |
| ,868,632 | 2/1975 | Hong et al. | 340/146.1 AL |
| 3,893,071 | 7/1975 | Bossen et al. | 340/146.1 AL |

Primary Examiner—Charles E. Atkinson
Attorney, Agent, or Firm—Herbert F. Somermeyer

[57] ABSTRACT

Multiple symbol correction employing auxiliary pointers is enhanced by unique interaction of code structures either with ambiguous auxiliary pointers or data structures for precisely locating errors. For example, a code apparatus can correct two symbols in error only with two error location pointers; with three error location pointers, the code cannot correct the errors since error location is ambiguous. Once this has been determined, the features set forth in the present invention are employed to delimit the error burst such that the code apparatus may correct two symbols in error, even with ambiguous error location pointers. With no auxiliary pointers, methods and apparatus can create such auxiliary pointers in particular data structures and error patterns.

12 Claims, 16 Drawing Figures

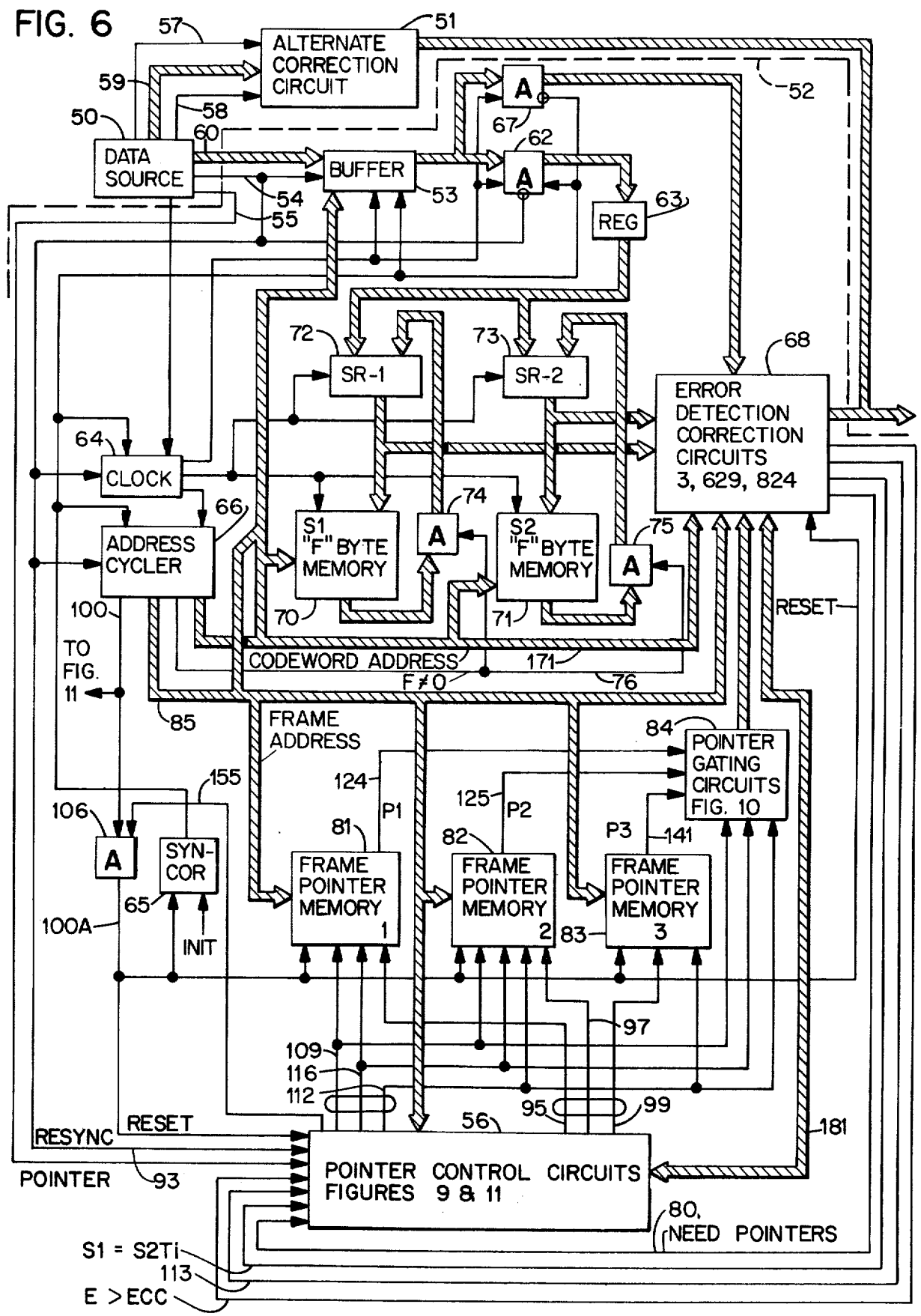

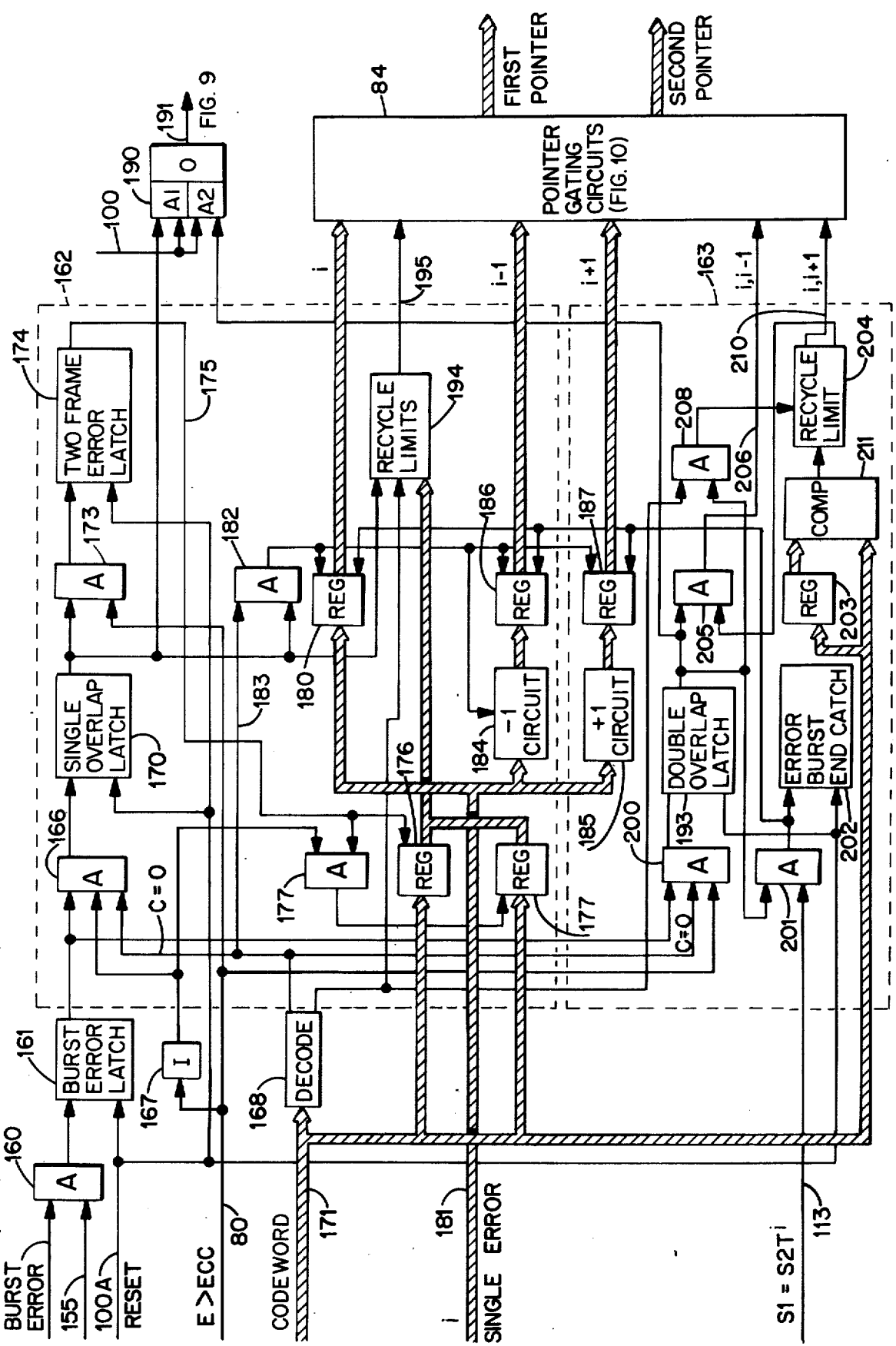

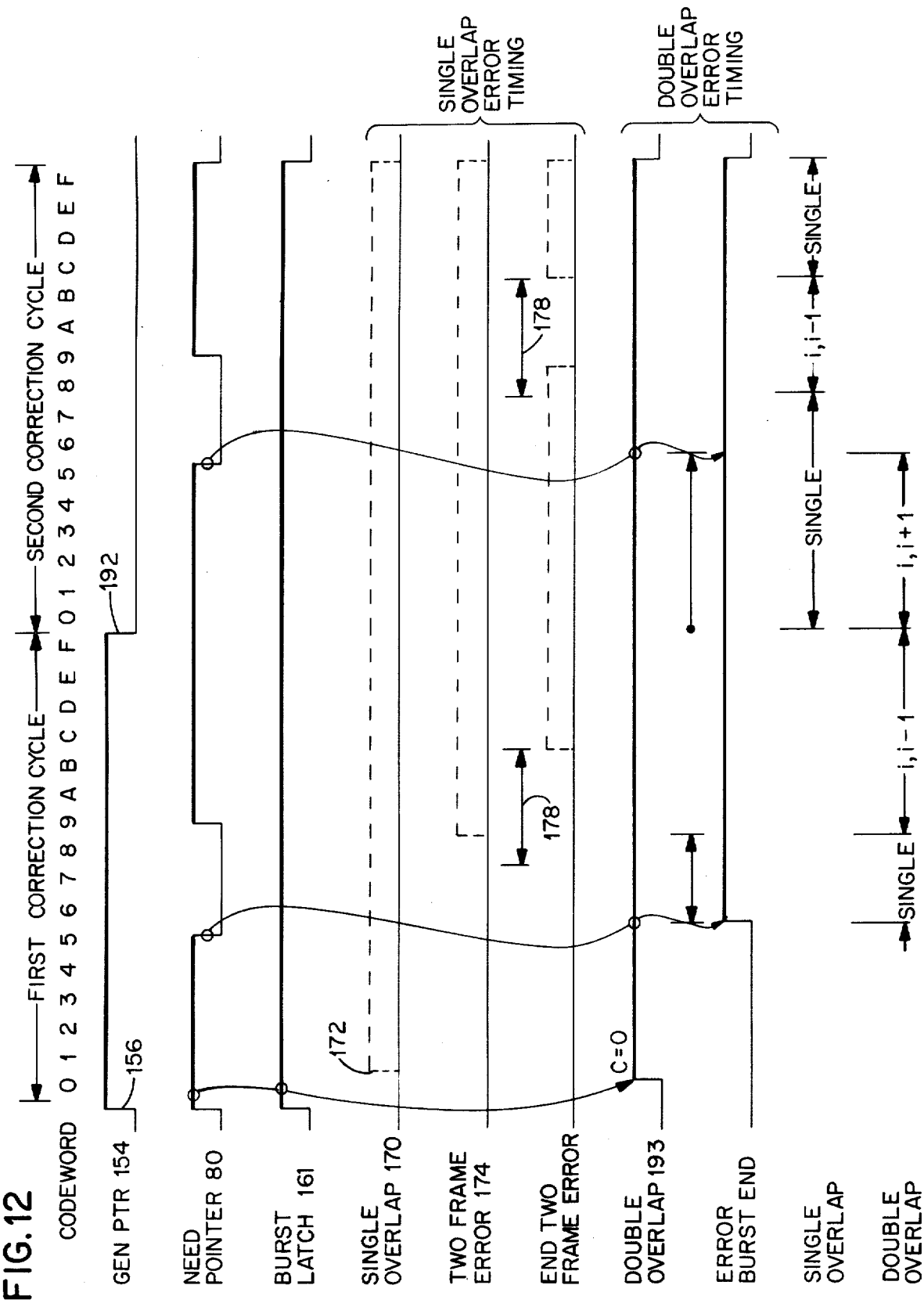

ENHANCED ERROR CORRECTION

DOCUMENTS INCORPORATED BY REFERENCE

Patel U.S. Pat. No. 3,745,528 is cited for a subfield code structure and apparatus usable with certain aspects of the present invention.

Commonly assigned copending application, Patel, Ser. No. 493,195, filed July 30, 1974, entitled "Error Correction of Serial Data Using a Subfield Code," now U.S. Pat. 3,913,068 issued Oct. 14, 1975 is cited for apparatus and methods usable with certain aspects of the present invention.

Bossen U.S. Pat. No. 3,629,824 is cited for an error detection and correction apparatus for correcting two symbols in error and usable with the present invention; in particular, the present invention can enhance operations of the apparatus disclosed in both U.S. Pat. Nos. 3,629,824 and 3,745,528.

Hinz, Jr., U.S. Pat. No. 3,639,900 is cited for the use of ancillary pointers in connection with error location methods and apparatus.

Bailey et al U.S. Pat. No. 3,641,526 is cited for apparatus and methods of resynchronizing readback of digital signals from a recorded medium.

Hong et al U.S. Pat. No. 3,810,111 is cited for apparatus usable as a readback data source and with which the present invention can be advantageously practiced.

Frey, Jr., U.S. Pat. No. 3,475,725 is cited for apparatus showing a general arrangement of error correcting apparatus employing the present invention.

BACKGROUND OF THE INVENTION

This invention relates to error detection and correction, and more particularly to improved apparatus and methods for combining error syndromes and data for enhancing the eerror correcting procedures.

The addition of redundant bits to a data message for error correction and detection employing block codes is well known for correcting a plurality of symbols in error in a burst of errors. For example, in U.S. Pat. No. 3,629,824, encoding and decoding apparatus detects a plurality of symbols in error, can correct one symbol in error without auxiliary pointers, and can correct two symbols in errors with auxiliary pointers. Under certain circumstances, the number of auxiliary pointers may not always be two; that is, there may be three pointers or no pointers. In such a situation, the apparatus of U.S. Pat. No. 3,629,824 is incapable of correcting the error, even though errors have been detected. In accordance with other procedures beyond the scope of the present description, error recovery is attempted. This can be done in magnetic media by re-reading the record and, in data communication, by retransmission. In some instances, the re-read of magnetic media or retransmission may result in the same number of pointers; i.e., there may be no pointers or increase in pointers. Data is therefore still uncorrectable.

There is a finite possibility, when data is interleaved as described later in the specification, that the first byte of a plurality of code words constitutes a pointer window and the second byte of the same plurality of code words constitutes a second pointer window, etc., that the burst error may not coincide with the pointer window boundaries. In such a situation, delimiting the error burst can bring the error condition within the capability of the error correcting apparatus, even though the auxiliary pointers indicate otherwise.

SUMMARY OF THE INVENTION

It is an object of the present invention to provide an enchanced error correction decoding procedure in which the effectiveness of the code apparatus is extended beyond the indicated effectiveness.

Error-bound indications are generated by first generally locating the location of a signal error burst, dividing the general location into predetermined portions and generating a plurality of error syndromes, applying error correction procedures against those error syndromes for detecting the number of errors in said general locations and comparing the result of the error correction procedures with a threshold, and indicating a bound of a burst error when said thresholds have a predetermined relationship to said resultant.

In one aspect of the invention, in a matrix multiplication error correction apparatus, error limits are defined by equality of a first syndrome indicating an error pattern and a second syndrome multiplied by a matrix $T^i$ where $i$ identifies the geometric location of a first given symbol not in error. In another aspect of the invention, single error correction is followed by double error correction in order to extend error correction capabilities to an apparent three-symbol-in-error correction.

In another aspect of the invention, double error correction is employed for correcting three frames of data, all indicated as being in error, wherein delimiting burst errors in at least two of said frames is achieved by combining a resultant error correction signal with another error correction signal for ascertaining a predetermined relationship therebetween which indicates the location of a predetermined error condition.

In yet another aspect of the invention, the error correction apparatus is employed in a comparative mode to generate pointers for error correction purposes. Effectively, no auxiliary pointers are available and the code apparatus itself is capable of correcting a number of errors less than the number of errors detected by error detecting apparatus.

The foregoing and other objects, features, and advantages of the invention will become apparent from the following more particular description of a preferred embodiment of the invention, as illustrated in the accompanying drawing.

THE DRAWING

FIG. 6 is a generalized block diagram of apparatus incorporating the teachings of the present invention.

FIG. 11 is a block schematic diagram illustrating a second aspect of the invention and usable as a portion of the pointer control circuits and pointer gating circuits of the FIG. 6 illustrated apparatus.

FIG. 12 illustrates idealized timing signals used to describe the operation of the FIG. 11 illustrated apparatus.

GENERAL DESCRIPTION OF THE ERROR CORRECTING METHODOLOGY

Figure 1:
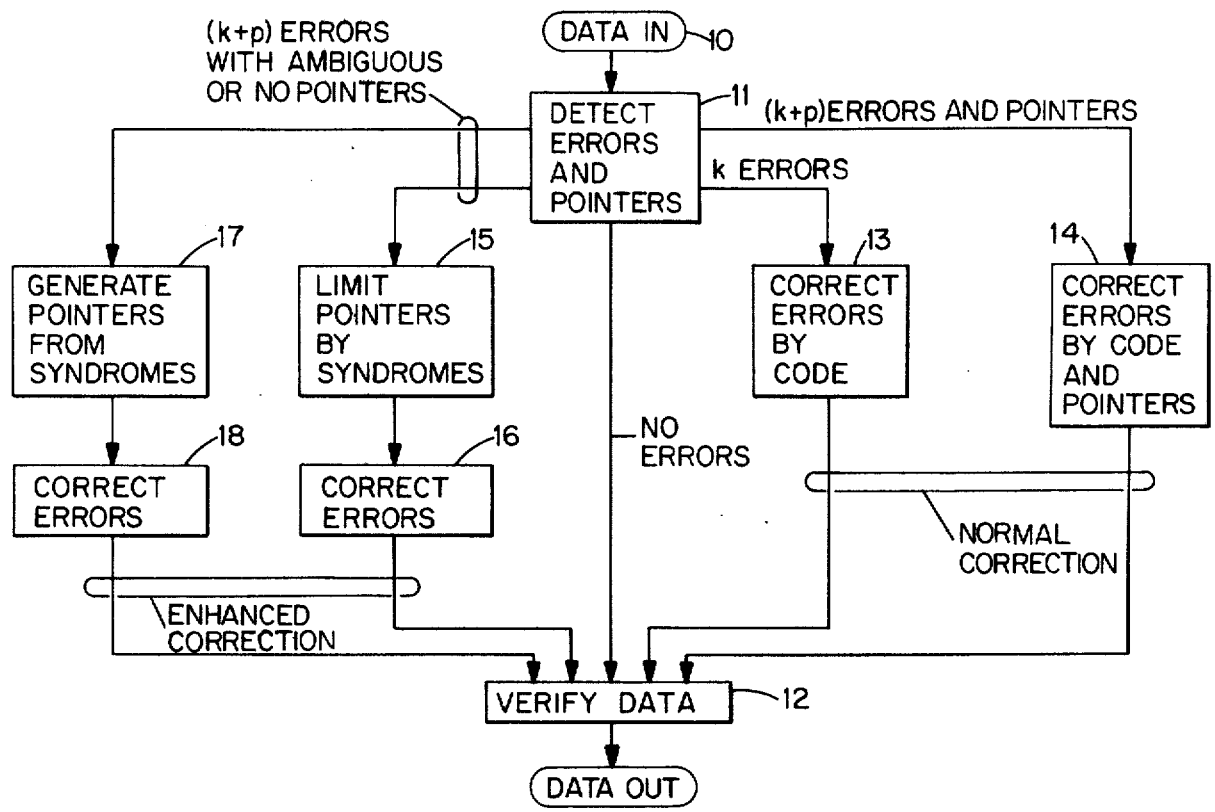
FIG. 1 is a generalized flow diagram of procedures and apparatus which may employ the present invention.

Referring to FIG. 1, the flowchart indicates the error correcting procedures usable in accordance with the present invention in a generalized sense. The procedures are entered at 10, data-in. Such data is accumulated; then, errors are detected and auxiliary pointers generated at 11 in accordance with Hinz, Jr., U.S. Pat. No. 3,639,900. The error detection code may detect no errors with the procedure then going to step 12, wherein the correctness of the data is further verified. If verification is successful, the data is then supplied to utilization apparatus (not shown). In the event error detection apparatus, in step 11, detects $k$ errors, and the capability of the error correction apparatus is $k$ errors, then at step 13, the code apparatus corrects all the errors using the code apparatus without reference to auxiliary pointers. On the other hand, if greater than $k$ errors, for example, $k+p$ errors, is detected and thre are $k+p$ auxiliary error location pointers, then the error correction apparatus corrects $k+p$ errors at 14. In accordance with the design of the error correction apparatus, steps 13 and 14 represent normal error correction procedures; that is, the apparatus is specifically designed to correct $k+p$ errors with $k+p$ auxiliary pointers and k errors without auxiliary pointers. The corrected data is verified for correctness at step 12, as previously described. The procedures of steps 13 and 14 are described in U.S. Pat. No. 3,629,824 wherein $k=1$ and $p=1$.

There are circumstances wherein there are greater than $k$ apparent errors and there may be more than $k+p$ error location pointers or there may be no error location pointers. Then, in accordance with the present invention, enhanced correction is provided by the procedures and apparatus described below. For example, if there are more than $k+p$ error location pointers, the pointer extent, i.e., the boundaries of the actual error locations, is delimited (more precisely defined) at step 15. This is done in accordance with the invention by syndrome calculations, as will be more fully described. Once the pointers are delimited, the errors are corrected at 16 in substantially the same manner as done in step 14. On the other hand, there may be no pointers. Then, at step 17, the error location apparatus of the present invention generates auxiliary error location pointers from the error syndromes. Once the pointers are generated by the code apparatus, the errors are corrected at 18 using substantially the same procedures as used in step 14. Again, the data is verified for correctness in step 12 to ensure that no mixcorrected, undetected errors are sent to utilization apparatus (not shown). The procedures of steps 15-18 assume there is a burst error; that is, the error is continuous from the beginning to the end with no intermediate correct data. It should be noted that probability will indicate that a bit or two may be correct. However, there is no complete symbol (each symbol may have eight bits of data) that is correct within the extent of the error burst. The definition of the error burst will become more clear from a continued reading of the specification.

Figure 2:
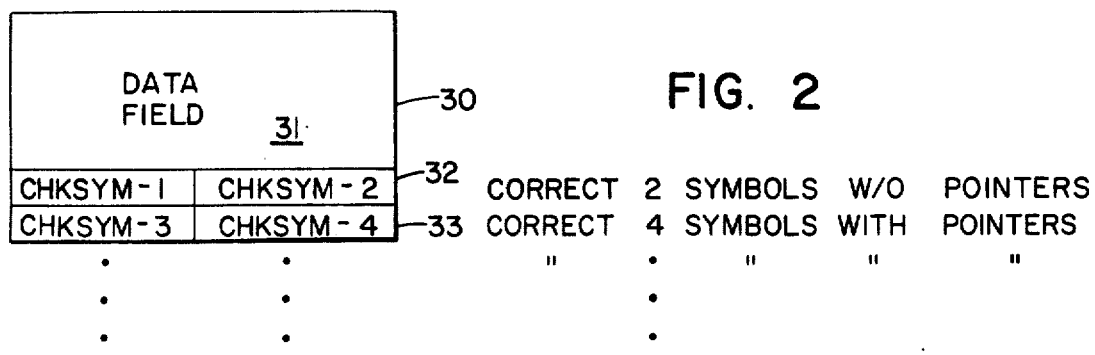
FIG. 2 is a diagrammatic showing of data field and check symbol field relationships.

Referring next to FIG. 2, a generalized relationship between data and check symbols is shown. The entire field 30 consists of data, as at 31, plus a plurality of check symbols. To correct two symbols in the data field 31 with two auxiliary pointers or one symbol with code apparatus, two check symbols, as at 32, are employed. For correcting two symbols without auxiliary pointers and four symbols with auxiliary pointers, a total of four check symbols, as at 33, are employed. Generalizing, the number of check symbols correctable without auxiliary pointers is one-half the number of check symbols, provided the check symbols and the data symbols are of the same modulus. The number of symbols correctable with auxiliary pointers is equal to the number of check symbols. In order to most advantageously practice the present invention, it is desired to interleave a plurality of code words and check symbols as a single symbol sequence.

Figure 3:
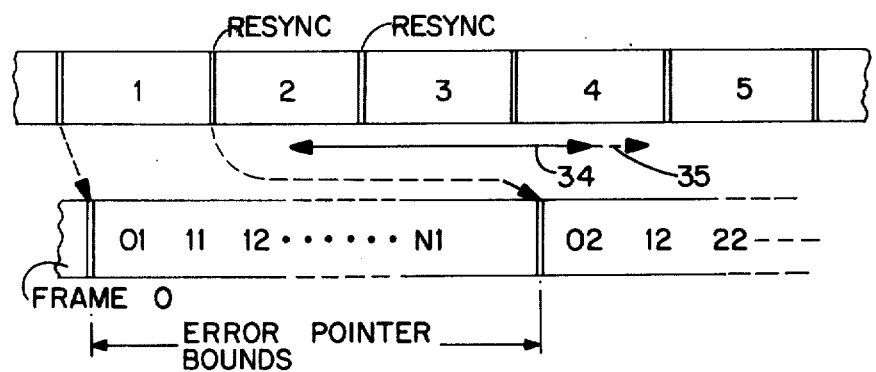
FIG. 3 is a diagrammatic showing of interleaved data organization with which the present invention may be advantageously employed.

In FIG. 3, the numerals 1, 2, 3, 4, and 5 indicate frames of the serial symbol sequence separated by resync characters. Each frame consists of a plurality of symbols, one symbol from each of the code words, 0, 1, . . . F (sixteen code words). For example, frame 1 consists of the first symbol in each of the code words, hence, has symbols 01, 11, 21, . . . F1. In a similar manner, frame 2 has the second symbol of each of the code words consisting of 02, 12, 22, etc. Then, code word 0 consists of M symbols (M=15, for example) 01, 02, . . . 0M. The second code word consists of symbols 11, 12, 13, . . . 1M, etc. For error correction purposes, the extent of each auxiliary error pointer is between the resynch points; i.e., the frame extent is equal to the error pointer extent. Therefore, in order to correct two symbols in error in any of the code words, for example, symbols 2 and 3, the error pointers must be located coincident with frames 2 and 3. If, however, an error burst extends over three frames, then three error pointers will be generated, for example, for frames 2, 3, and 4. However, in a practical sense, the actual extent of the error bursts may extend as indicated by arrow 34. In a true sense, then, at any one instant of time, there are no more than two symbols in error; i.e., the error burst beginning in frame 2 begins at a byte, for example, 9, and ends in frame 4, for example, at byte 5. If, however, the error burst extended, as indicated by dotted line 35, to byte 10, for example, then byte 9 position would represent three symbols in error and, hence, be uncorrectable with a $p=1$, $k=1$ code. It is also assumed that the error burst 34 is continuous on a byte basis. Experience has shown that in magnetic recording this is often the case. Hence, as will be shown, the procedure of the present invention provides reliable, enhanced error correction apparently beyond the scope of the error correcting capability of the apparatus when measured on a frame-by-frame basis.

The symbol sequence of FIG. 3 is represented in magnetic recording preferably in accordance with Hong et al U.S. Pat. No. 3,810,111, supra, with the resynchronization character being in accordance with Bailey et al 3,641,526. That is, the Bailey resynchronization character would be interleaved among the Hong et al defined modulation signals for representing data. The check signals would be recorded using the Hong et al technique as if it were data.

Figure 4:
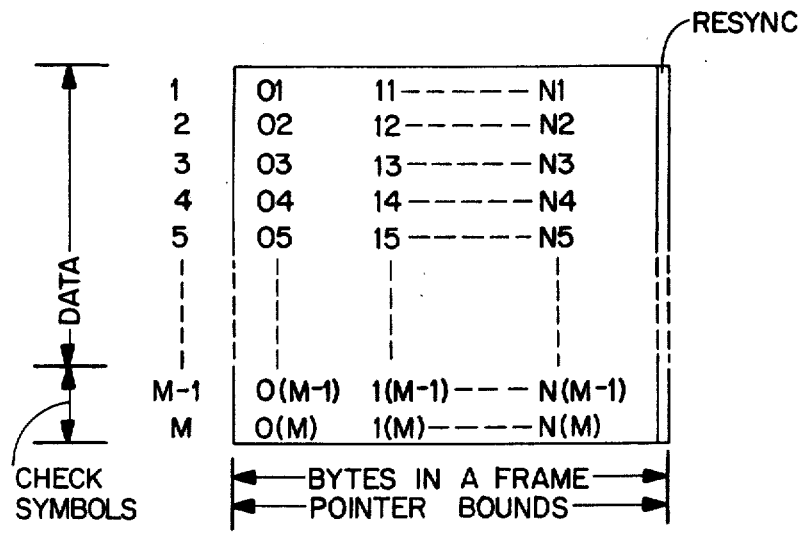
FIG. 4 is a diagrammatic showing of the mathematical representation of the FIG. 3 illustrated data arrangement and used to illustrate the operation and procedures of the present invention in the later figures.

In order to correct errors in accordance with the present invention, the interleaved data structure of FIG. 3 should be put into a mathematical arrangement for ease of handling. This is shown in FIG. 4 wherein the serial symbol stream is represented as an array of symbols. The horizontal ordinate represents the code words 01 through ON, etc., while the vertical ordinate represents the frames 1 through M. The resync characters are indicated in the righthand margin. These resync characters are used not only for resynchronization of the clocking system and detection circuits, but also for delimiting the error pointer extents. Each symbol pair in FIG. 4 represents one byte of data, i.e., eight bits, with a symbol being equal to a byte.

Figure 1A:
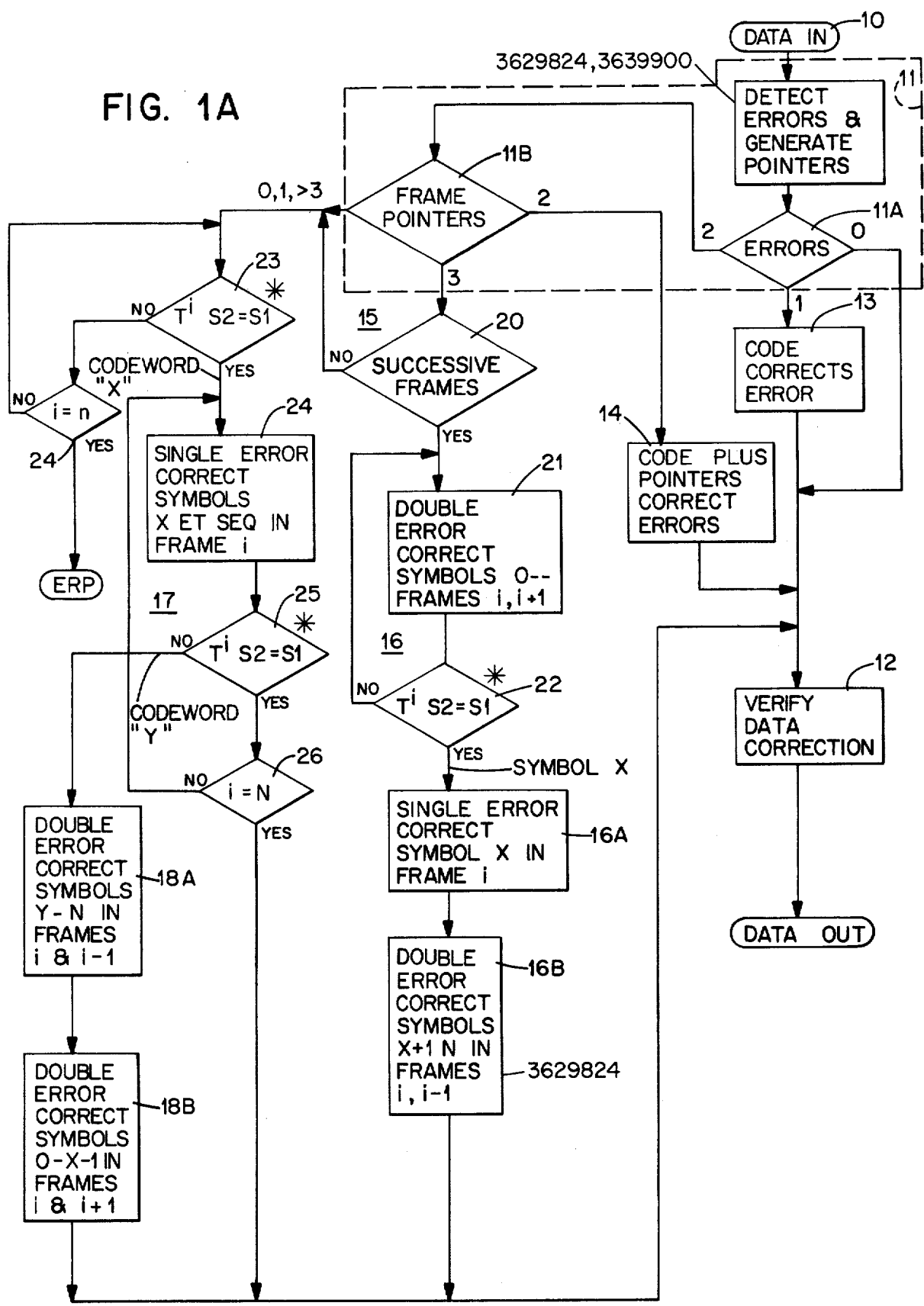
FIG. 1A is a detailed version of the FIG. 1 illustrated flowchart.

FIG. 1A is a more detailed version of the FIG. 1 illustrated flowchart for error correction apparatus wherein $k=1$, $=1$, and particularly to show operation of the invention. In step 11, the apparatus of U.S. Pat. No. 3,629,824 determines whether or not there are 0, 1, or >1 errors, as at 11A. When there are multiple errors, the apparatus determines at 11B whether or not the number of auxiliary pointers is 2, 3, or some other number. If there are two auxiliary pointers ($k=1$, $p=1$), then step 14 is entered, as previously described. For three errors, step 15 is entered, which first determines at 20 whether or not the error bursts are in successive data frames, i.e., one burst of symbols in error. If this is the case, then it may be possible to delimit or more precisely define the error burst. This is done in step 16 by first double error correcting symbols in a first two of the successive data frames in error, as at 21. This is done until the syndrome calculations $T^f(S2) = S1$ (refer to U.S. Pat. No. 3,629,824), as at 22. At this point, there must be single symbol in error, at which time step 16A single corrects at least one symbol in error. Then, at 16B, the remaining symbols are corrected using double error correction procedures set forth in step 14. Hence, in steps 21 and 22, there is double error correction employed until the syndromes indicate there is but one symbol in error. Then, there is single error correction, step 16A is employed, until double errors again occur, upon which double error correction procedures, step 16B, are again employed. Accordingly, the invention teaches that by mixing single and double error correction with a number of pointers greater than two ($k=1$, $p=1$), $k+p$ errors can be corrected even though there are $k+p+1$ auxiliary location pointers. The above will become more clear when the data format for which the error location procedures were designed is more fully described.

Steps 17 and 18 are performed when there are 0, 1, or greater than 3 pointers. In this case, there is more than one error per code word as determined in 11A; however, the auxiliary pointer information is incomplete or ambiguous and cannot be successfully used for error correction. In step 17, error correction apparatus compares two frames of two symbols each until the calculation $S1=S2(T^i)$. If, in any set of two frames, this is not the case, then the term $i$ is compared with the maximum number of frames in the data set. When this is equal, as indicated at 24, an uncorrectable situation, even with enhanced error correction, exists. At this time, error recovery procedures are employed. The syndrome equality indicated at 23 occurs, then an error burst is identified. Initially, the single error correction is employed in code word X as at 24 until syndrome inequality is again detected at 25. If the equality is continually detected, then at step 26 it is detected whether or not the end of the data set has been reached; that is, is the ith frame equal to N, where N is the number of frames in the code word. If it is, then step 18B is entered and code words 0 to X−1 are corrected in frames $i$ and $i-1$ before entering 12 to verify the corrected data. If not, code words Y to N are corrected in steps 18A and 18B. In step 18A, double error correction occurs for symbols Y to N in frames $i$ and $i-1$. Upon completion of the Nth symbol correction, double error correction continues for code words o to X-1 in frames $i$ and $i+1$. Upon completion of the double error correction 18B, step 12 is again entered. Hence, where there is indeterminate error location pointers in the error correction apparatus, single error correction is attempted for each code word in succession until a sequence of single error correctable code words, X through Y−1, is found. Multiple errors in code words Y through N are then corrected in frames $i$ and $i-1$. Finally, correction is completed on code words o through X−1 in frames i and $i+1$. It should be noted that there may be no single error correction; that is, the multiple errors occur in all code words. In this case, the extent of the error is indeterminate and error recovery procedures are employed.

Figures 5, 5A, 5B, 5C:
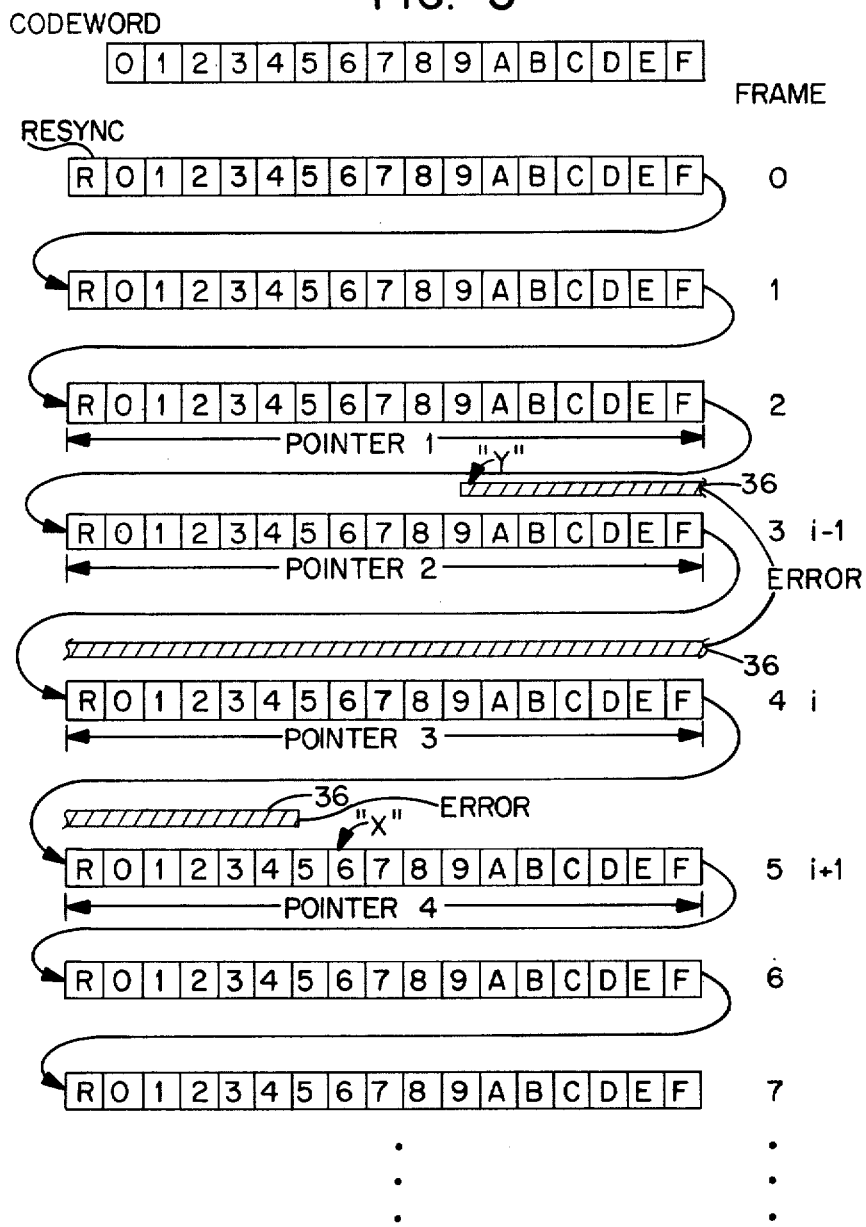
FIG. 5 is a diagrammatic showing of applying the procedures of the present invention to a multiple-symbol-in-error correction condition.
FIG. 5A is an error condition wherein the principles of the present invention are extended to error correction apparatus of greater capability than that assumed in the FIG. 5 illustration.
FIG. 5B is a diagrammatic showing of another error condition similar to that shown in FIG. 5A and for an error correction code apparatus with yet greater error detection and correction capabilities.
FIG. 5C is a diagrammatic showing of a single overlapped double-error condition.

FIG. 5 illustrates an error mode correctable by the present invention. The resync character R is denoted by the numeral R at the beginning of each frame. For ease of general reference, the frame in error which is completely in error is denoted the ith frame. In the FIG. 5 illustration, it is frame 4. The $i-1$, or frame 3, is partially in error as is the $i=1$ frame, frame 5. Using the pointing definition as described for FIG. 4, frames 3, 4, and 5 all have error location pointers for indicating three symbols in error. Using the apparatus of U.S. Pat. No. 3,629,824, this is an uncorrectable error. The actual error is indicated by the hashed areas 36. It is seen that the actual error begins with byte 9 of frame 3, extends completely through frame 4, and up to and including byte 5 of frame 5. As will be pointed out later, the lowest numbered frame will be denoted pointer 1, frame 4 will be pointer 2, and frame 5 will be pointer 3. Code word Y is the jth code word corresponding to the 9th symbol, while code word X is the 6th code word. Using the apparatus of U.S. Pat. No. 3,629,824, and of U.S. Pat. No. 3,639,900, three pointers are generated and stored. At this point in time, error 36 is ambiguously located. To precisely locate error 36, the code apparatus of U.S. Pat. No. 3,629,824 is employed with the error syndromes and the maxtrix multiplier to first correct code words 0 through 5, assuming errors in frames 4 and 5 until code word X is found. This is the lowest numbered code word having but one symbol actually in error which is correctable without pointers ($p=1$). Then, code words 6, 7, and 8 are corrected using single error correction. Code word 9 has two symbols in error requiring double error correction. The double error correction procedures of U.S. Pat. No. 3,629,824 are then followed through code word F for correcting symbols F in frames 3 ($i-1$) and 4 ($i$).

Hence, when three consecutive pointers or three consecutive frames are detected, the pointers are delimited by first double error correcting code words with errors in the $i$ and $i+1$ frames until a single symbol in error code word is found, such as at 6. Then, single error correction proceeds until a code word having a double error is again detected. At this time, the $i-1$ and ith frames of the remaining code words 9 through F are error corrected. The error correcting capability of a code apparatus is extended when operating with interleaved data by first double error correcting, then single error correcting, and then double error correcting using pointers which are selectively gated in accordance with syndrome calculations of the code apparatus.

It is also possible that more than three error location pointers are generated in accordance with Hinz., Jr., or that only one error location pointer is generated. It is also possible that nonconsecutive frames may have error location pointers. For example, frame 1 not actually in error may actually have an error location pointer. Of course, such a situation prevents one from following the procedures identified above which correspond to steps 15 and 16 of the FIG. 1 flowchart. In the case there are indeterminate or nonconsecutive pointers, the code itself can be used to generate pointers. In this case, the code words are examined for determining the number of errors. First, code word 0 is examined, etc., until code word 6 is examined corresponding to the 6th byte of each frame. At this point in time, a single error is detected in that code word; and a single error is corrected until code word 9, at which time it is assumed that a double error has occurred. It is also assumed that it is the $i$ and $i-1$ code words that are in error. Double error correction occurs until the Fth code word is corrected, at which time code words 0 through 5 are then corrected using double error correction on the $i$ and $i+1$ frames.

All of the above assumes that there are actually no more than two symbols in error at a given time, which may or may not be a valid assumption. It is preferred that the auxiliary pointers be used and be limited in that it is faster than the re-examination and generation of the code symbol of the code location pointers using the above techniques and a priority information that burst error conditions are the most likely error conditions. It is also possible that code word 5 not be in error; in this case, even with no pointers, single error corrections are applied to symbols 0 through 8 and double error correction is applied to symbols 9 through 15 for the $i$ and $i-1$ frames. It is also possible that the third frame not be in error. In this case, single error correction would be applied to symbols 6 through F and double error correction to symbols 0 through 5, and in that sequence.

Therefore, when interleaved data sets with predetermined error location boundaries indicate more errors than have actually occurred and than are correctable by the error correction apparatus, the above procedures enable the error correction code to correct the true number of symbols in error and to generate pointers. In those instances of a single burst error in the data set, it is possible there be more than one burst error; hence, in addition to the error correction procedures described above, error detection symbols are appended to the entire data set. Error detection apparatus (not shown) are used to verify that the correction procedures of the present invention have not resulted in miscorrected errors. It should be noted that the procedures of the present invention are applicable to those instances when the expected procedures of the error correction apparatus have initially failed to correct errors. By employing the above procedures, repositioning of magnetic media with respect to transducers may be prevented, thereby saving valuable time in a data processing system.

FIG. 5A illustrates an error pattern not correctable in accordance with the present procedures wherein $k=1$ and $p=1$. The frames 40 through 45 of interleaved data have a burst error in frames 41 through 44 having more than two symbols in error at each given code word, i.e., represented by the vertical ordinates. If the error correction capability of the code apparatus was $k=2$ and $p=2$, then the error in frames 41 through 44 would be correctable using step 14 of the FIG. 1 illustrated flowchart. On the other hand, a code apparatus with $k=2$ and $p=2$ may use the procedure of the present invention to correct the frames P1 through P5 of FIG. 5B. Since there are more than $k$ errors in the code words between the delimited burst, as at 46 and 47, the code apparatus must require auxiliary pointers before correction can proceed; that is, the second-mentioned procedure wherein code apparatus generates its own pointers is not employable with the FIG. 5B illustrated error pattern for $k=2$ and $p=2$.

FIG. 6 illustrates apparatus employing the present invention. That apparatus is a modification of the apparatus shown by J. W. Marshall in "Error Correction Apparatus," IBM TECHNICAL DISCLOSURE BULLETIN, Volume 17, Number 4, Pages 974 through 976, September 1974. The error correction apparatus described in the IBM TECHNICAL DISCLOSURE BULLETIN article is that apparatus employing the error correction of U.S. Pat. No. 3,629,824, Patent Application Ser. No. 493,195, supra, and particularly corresponding to operations in the FIG. 1 illustrated flowchart corresponding to no errors and error correction in steps 13 and 14, i.e., normal error correction procedures. FIG. 6 includes that apparatus, plus the apparatus required for the enhancement of the FIG. 1 illustrated steps 15 to 18. Also, operation of the FIG. 6 illustrated apparatus is explained with particular reference also to FIGS. 7 and 8 for showing the flow of data and syndrome signals through the apparatus, including the interim storage of same. A data source 50 supplies a string of symbol signals, such as shown in FIG. 3. Such data source may be a rotating head magnetic tape recorder or a magnetic storage disk wherein the error mode of readback is of the burst signal type and most probably of a continuous burst of signal errors. Since it is desired to correct errors on a real-time basis, a pair of error correction circuits 51 and 52 are alternately and successively actuated to detect and correct errors in accordance with Frey, Jr., U.S. Pat. No. 3,475,725. Circuits 52 are shown in detail, it being understood that the circuits 51 are identical to circuits 52, but alternately actuated.

Data from source 50 is accumulated in frame buffer 53 for error detection and correction procedures. To start the operation, source 50 supplies an initiate signal over line 54 to start buffer 53 operation and to error correction circuits 52 for resetting same to an initial condition. Auxiliary pointer signals, generated in accordance with Hinz, Jr., supra, travel over line 55 to later-described pointer control circuits 56. In a similar manner, the alternate correction circuits 51 receive pointer signals over line 57 and an initiate signal over line 58. Data signals are supplied, respectively, over cables 59 and 60.

The first step in error correction procedures is to generate the syndromes and detect whether or not errors have occurred in the data. The data signals being accumulated in buffer 53 also travel through AND circuits 62 to input holding register 63. ANDs 62 are jointly actuated to pass the buffer 53 data signals by the signal received over line 54, a timing signal from clock 64, and a syndrome phase or first signal from the syndrome correction trigger 65. Trigger 65 is initially set to a reference condition by an initiating pulse (not shown), such that circuit 52 generates a syndrome on the first-received signals from source 50. When the address cycler 66 (later described) has gone through a predetermined cycle, trigger 65 is triggered to the correction phase for enabling AND circuits 67 to pass buffer 53 signals under clock 64 control to error correction circuits 68 constructed in accordance with U.S. Pat. No. 3,629,824.

Figure 7:
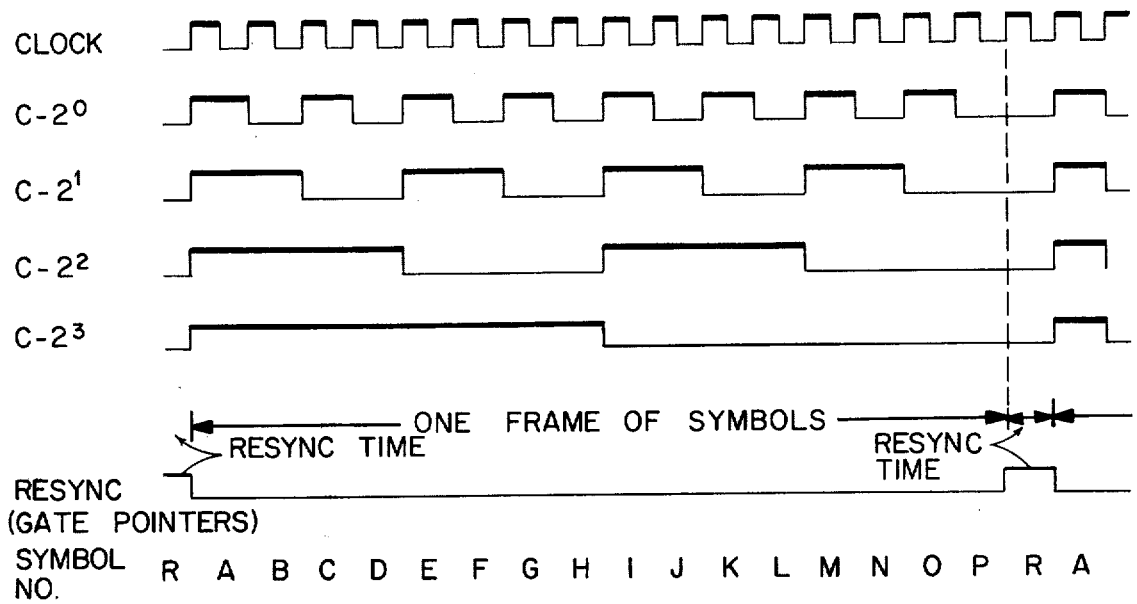
FIG. 7 is an idealized set of waveforms illustrating code word gating within one frame of code signals for illustrating one aspect of the operation of the FIG. 6 illustrated apparatus.

During the first phase, syndrome generation phase, register 63 serially receives the symbols. Clock 64 counts the symbol times as shown in FIG. 7. There is one complete cycle of clock for each symbol generation. In the illustration of 16 symbols per frame, the clock counts the address cycler 66 lower digit positions through the cycles of FIG. 7. Since there are 16 (0-F) symbols per frame, the syndrome memories 70 and 71 each have 16 bytes of storage, one byte for each code word to be error corrected. The address cycler 66 supplies a four-bit code word address corresponding to the $Cx2^0$, $Cx2^1$, $Cx2^2$, and $Cx2^3$ to both memories 70 and 71 for sequentially scanning the registers of the memory for insertion of the partially generated syndromes from the shift register syndrome generators 72 and 73, respectively, see U.S. Pat. No. 3,629,824 for such construction. That is, each data symbol in register 63 actuates both syndrome generators SR1 and SR2 to repetitively generate interim syndromes in accordance with U.S. Pat. No. 3,629,824. Initially, when the frame is zero, i.e., the syndrome generation is just starting, the two memories 70 and 71 must be effectively cleared. This is done by degating the feedback AND gates 74 and 75 by the F 0 signal on line 76 from cycler 66. With destructive readout of memories 70 and 71, they are cleared. The first syndrome portion from the first symbol received from register 63, i.e., frame 0, generates an interim syndrome which is then stored in memory 70 and 71. Upon the second frame, frame=1, AND's 74 and 75 are enabled to pass the partially calculated syndromes into SR1 and SR2 for combining with the received second symbols from register 63 and generated in accordance with U.S. Pat. No. 3,629,824. The above procedure is repeated until the final syndromes for all 16 code words are generated and stored in memories 70 and 71.

Once the syndromes are generated, error correction circuits 68 must determine whether or not there are any errors. Hence, on the last calculation, the syndrome signals from SR1 72 and SR2 73 are not only stored in memories 70 and 71, but also are supplied to error correction circuits 68 for error detection purposes. Circuits 68 respond to the final syndromes to detect errors when address cycler 66 has reached the last position for each of the code words indicating the next step in the data processing cycles. This state is not only indicated to circuits 68 by the frame and code word address signals on cables 85A and 85, but also by a carry-out signal traveling over line 100. The carry-out signal also toggles trigger 65 to the error correction phase and sets memories 81, 82, and 83 to a readout mode and toggles SYN-COR latch 65 to COR, the correction phase of operation.

Figure 8:
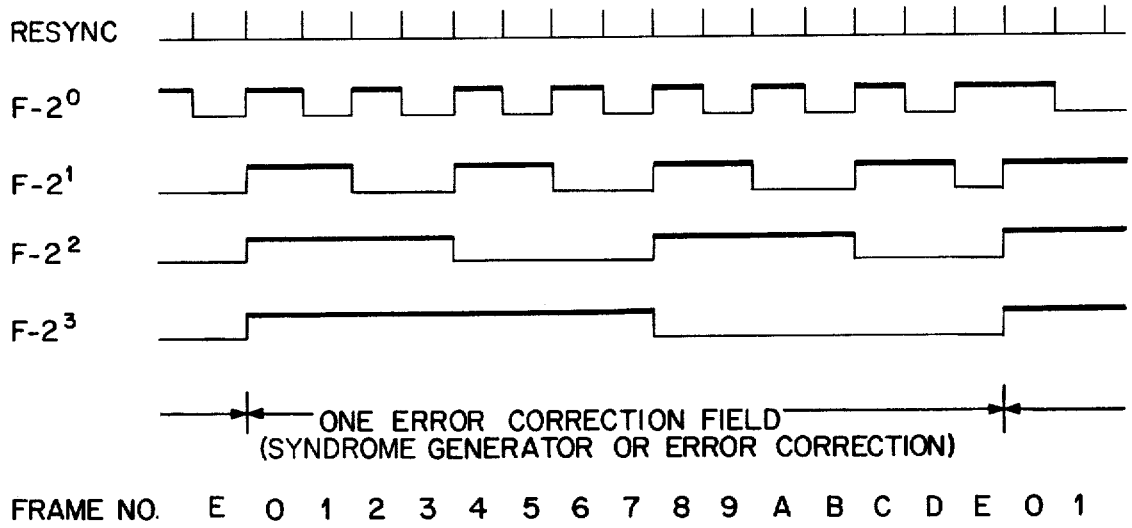
FIG. 8 shows an idealized set of frame timing signals used to further explain the operation of the FIG. 6 illustrated apparatus.

If circuits 68 detect no errors or a single error in the data set, then the error correction phase proceeds without reference to any of the pointers, even if a pointer has been received from data source 50. If, on the other hand, pointers are needed, a need-pointer signal on line 80 actuates pointer control circuits 56 to transfer pointers to error correction circuits 68 for double error correction. If only two pointers have been stored, such as in frame pointer memories 81 and 82, then the error correction proceeds in accordance with step 14 of the FIG. 1 flowchart. In the correction phase, address cycler 66 steps through the frame addresses as indicated in FIGS. 7 and 8, as described for the syndrome generation.

However, if there is a pointer stored in the additional pointer memory 83, then the auxiliary pointers ambiguously point to the error location; i.e., the pointer extent may be greater than the error extent, such as shown in FIG. 5. It is also possible that only one or no pointers have been stored in frame pointer memories 81 and 82, in which case error correction circuits 68 cannot proceed with correcting the data without the procedures set forth above for practicing the present invention. The procedures in steps 13, 14, 21-16B, and 23-26 are mutually exclusive, i.e., only one of the procedures is involved in correcting a given data array.

Figure 10:
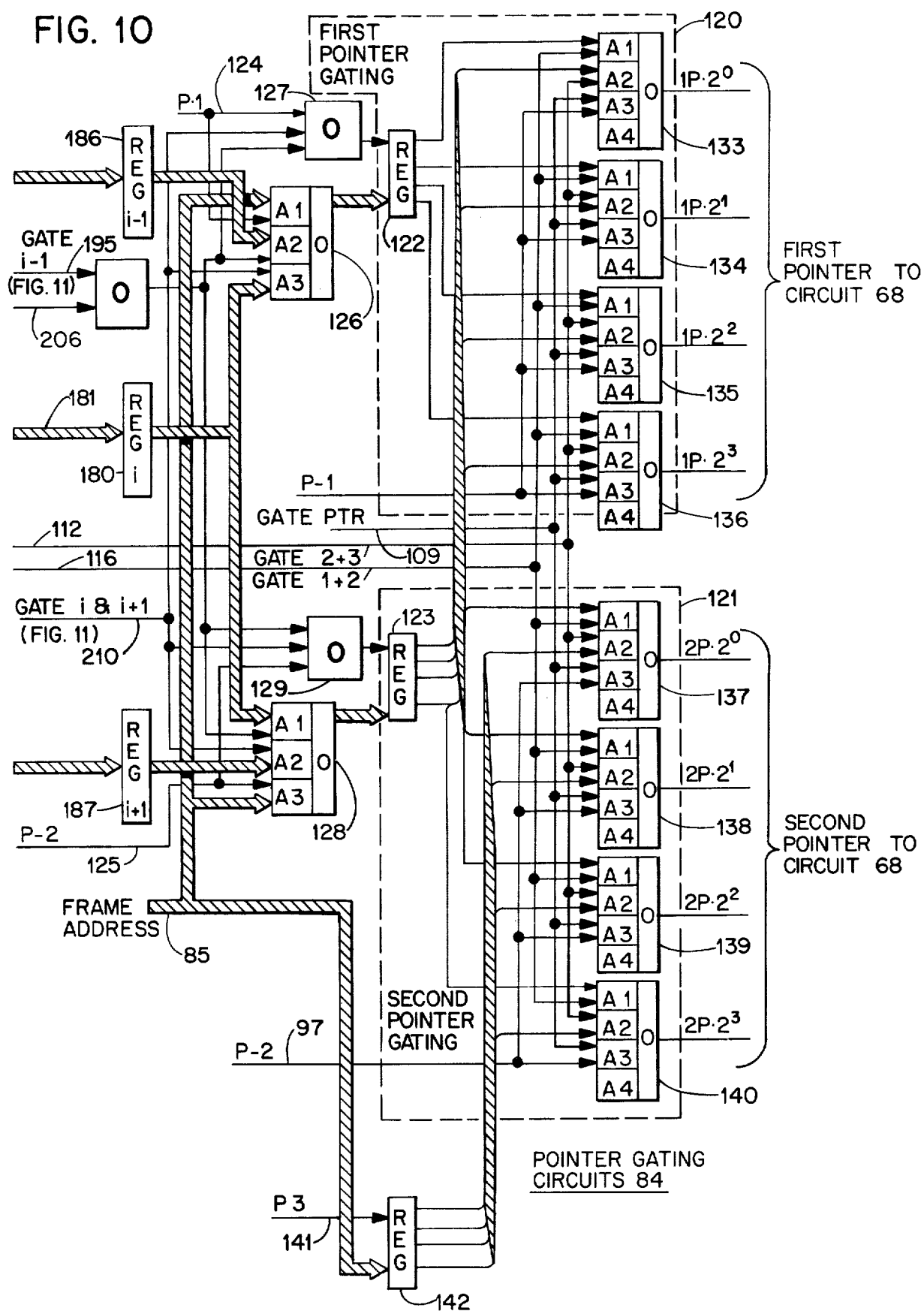
FIG. 10 is a block schematic diagram of pointer gating circuits usable with the FIG. 6 illustrated apparatus.

In the event the present invention is employed in the FIG. 6 illustrated apparatus, pointer control circuits 56 in combination with the pointer gates 84 of FIG. 10 sequence the apparatus in the correction phase in conjunction with the address cycler 66 to delimit the pointers or to generate pointers, as the case may be, for correcting error burst 36.

Address cycler 66 not only counts the symbols of each frame, but also counts the frames to generate a frame address set of signals traveling over cable 85 to address the memories 81-83, error correction circuits 68, and controlling pointer control circuits 56. In FIG. 8, address cycler 66 counts the frames denoted F through 15 frames (requiring four bits). These four bits are the upper four bits of cycler 66. Hence, cycler 66 is an eight-bit counter actuated each symbol period by clock 64. As seen in FIG. 8, one complete frame cycle corresponds to 15 resync signals and to one syndrome generation cycle of one error correction cycle.

Figure 9:
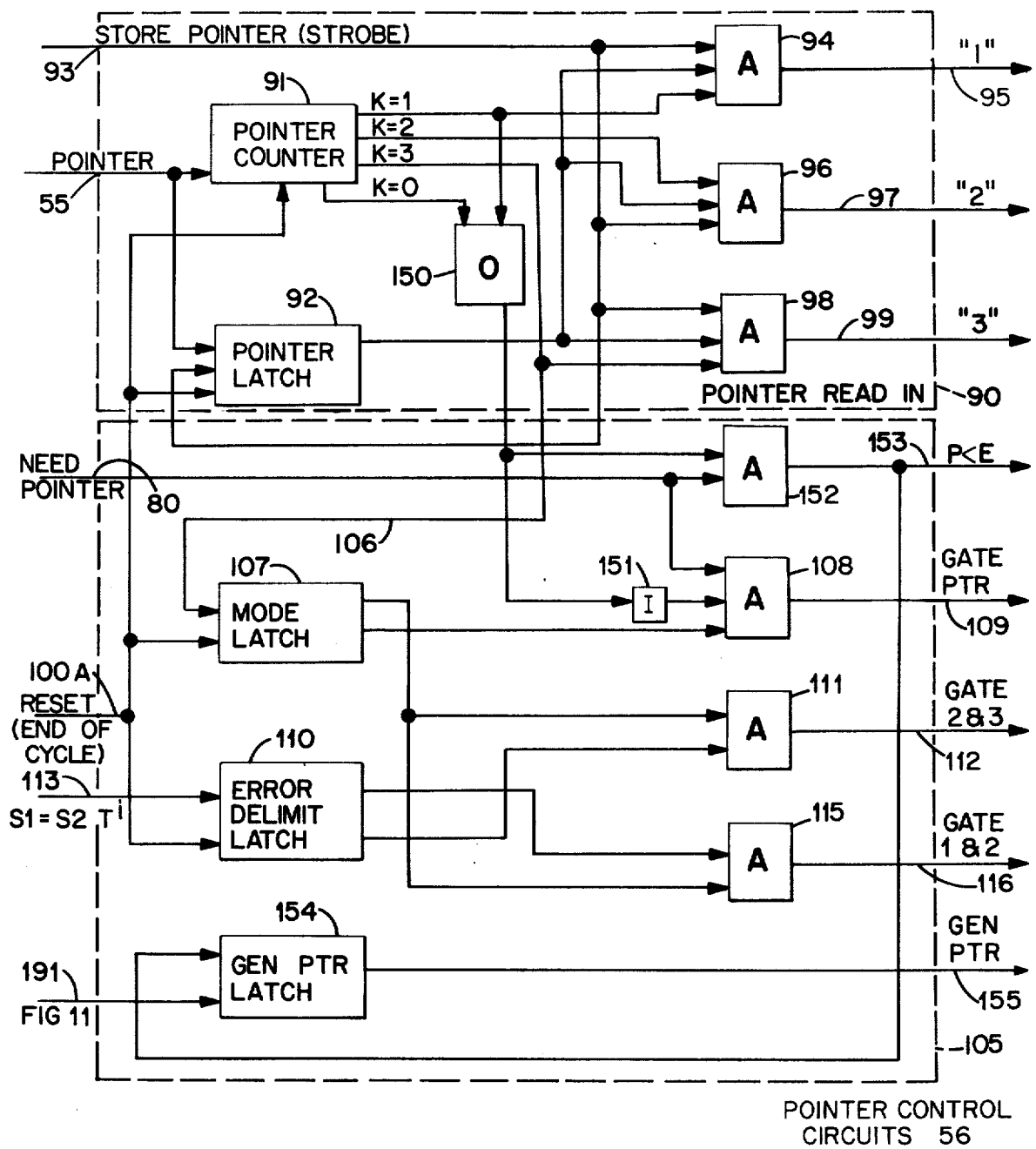
FIG. 9 is a block schematic diagram of pointer control circuits usable with the FIG. 6 illustrated apparatus.

A key portion is the receipt and control of auxiliary error location pointer signals. Pointer control circuits 56 store the auxiliary pointer signals received during the syndrome phase over line 55, as shown in FIG. 9. The pointer read-in portion 90 receives the pointers in pointer counter 91 and pointer latch 92. Latch 92 merely memorizes the fact that a pointer has been received in a given frame, while counter 91 counts the number of pointers actually received up through three in a set of data signals. The resync signal from source 50 traveling over line 93 signifying the end of a frame gates the counted pointers to the appropriate store 81, 82, or 83 and resets pointer latch 92. The first pointer goes to frame pointer memory 81 via AND circuit 94. AND 94 responds to the resync signal or store-pointer signal on line 93, and to the $k=1$ count from pointer counter 91, and to pointer latch 92 being set to supply a bit signal over line 95 for storage in memory 81 at the current frame address received over cable 85. Similarly, AND 96 responds jointly to count=2, pointer latch 92 being set, and to the line 93 signal to supply the second pointer over line 97 to memory 82, which is stored at the then-indicated frame address. In sequence of events, the pointer is first stored in 81; then, if a second pointer is received during the same data set, that second pointer is stored in memory 82. It is possible to receive a third pointer, which then is passed through AND 98 over line 99 to memory 83. At the end of each error correction cycle, i.e., data has either been corrected or an uncorrectable error has been detected, pointer counter 91 and pointer latch 92 are reset by a signal on line 100. Additionally received pointers cause pointer counter 91 to step to the $k=4$ state which disables AND's 94, 96, and 98. Hence, only three pointers can be stored for a given set of frames. The frame address of the pointer memories can signify the location of the error identified by the pointer signal. The pointer readin circuits 90 operate during the syndrome generation phase, i.e., source 50 supplies pointers over line 55 only during that phase. During subsequent phases, the operation is not activated because no pointer signals are received.

The pointer read-out portion of pointer control circuits 56 includes those circuits in dash box 105. Error correction circuits 68 supply a needpointer signal over line 80 to signify that the mode of error correction is for correcting two symbols in error. If there are two pointers, and only two pointers, then pointer counter 91 has counted to $k=2$ and not $k=3$. The pointer counter status indicates step 14 (FIG. 1) is to be executed. When three pointers have been received by circuits 90, counter 91 has counted to three. Its $k=3$ signal supplied over line 106 sets error correction mode latch 107 to the active condition. This signifies and memorizes that the number of pointers received from source 50 exceeds the error correction capability of the error correction apparatus 68. Hence, error locations as signified by the auxiliary pointers are ambiguous; enhanced error correction procedures are necessary. With latch 107 set to the active condition, AND 108 is enabled to pass the need-pointer signals to line 109 signifying that special procedures of the invention are necessary. Line 109 carries the need-pointer signals to pointer gates 84, as will be later described.

Since there are three pointers, respectively, in memories 81, 82, and 83, and only two can be used at a time, sequencing means are provided to gate first pointer signals from memories 82 and 83 and a second pointer signal from memories 81 and 82, one first pointer and one second pointer signal for each code word to be corrected. Different code words may have different pointers. It should be remembered that the lowest-numbered frame with a pointer represents the $i-1$ frame of FIG. 5. Using the procedures for steps 15 and 16, the pointers for frames i and i+1 are first gated; then, single error correction is provided for the intervening single symbol errors. Then, the $i-1$ and $i$ pointers corresponding to the pointers stored in memories 81 and 82 are gated to the error correction circuit. Error delimit latch 110 sequences the pointer gating. AND circuit 111 supplies pointer i and i+1 gating signals over line 112 in joint response to mode latch 107 being set and error delimit latch 110 being set. Error correction apparatus 68 then looks for a single symbol in error by comparing the syndrome S1 with the syndrome S2 as matrix multiplied by the matrix T during the jth sequence which, in the FIG. 5 illustration, is code word 6 ($j=6$). The signal received over line 113 from circuits 68 resets error delimit latch 110. This degates AND circuit 111. Since double error correction is no longer needed, circuits 68 remove the line 80 signal, degating AND 108, and thereby removing the signal from line 109, thereby signifying single symbol error correction. However, AND 115 is enabled to generate a gate-out pointer $i-1$ and $i$ signal over line 116 in joint response to latch 107 being set and latch 110 being reset. As will become apparent, the signals on lines 109 and 116 are combined upon the onset of double symbol correction, as in code word 9, to gate the indicated pointers to apparatus 68. Pointer gating circuits 84, shown in FIG. 10, include first pointer gating circuit portion 120 and second pointer gating portion 121. These two circuit gating portions pass the address of the frame for a code word (identifies symbol in error for each code word) with which the pointer circuits are to be used. In view of the multimode operation of the apparatus employing the present invention, the input gating to the first pointer register 122 and the second pointer register 123 includes a plurality of AND/OR circuits for executing step 14 of FIG. 1. Pointer control circuits 56 emit a gate pointer signal over line 109 to frame pointer memories 81 and 82. Such signal is a continuous signal during a normal correction cycle (step 14, FIG. 1). As address cycler 66 steps through the frame addresses, corresponding AND gates (not shown) enabled by the memorized pointers in the respective memories 81 and 82 gate the line 109 signal, respectively, over lines 124 and 125 to pointer gating circuits 84 for the duration that the given frame address is being emitted by cycler 66 over cable 85. In pointer gating circuits 84, the P1 signal activates the A1 AND circuit portion of A0 circuit set 126 to pass the frame address on cable 85 to first pointer register 122. Simultaneously, the P1 signal passes through OR circuit 127 for enabling register 122 to receive the pointer frame address. In this regard, register 122 is preferably constructed of D-type latches, wherein the P1 signal goes to the clock or C input, and the frame address goes to the respective D inputs of four latches in the register. Simultaneously, the P2 signal on line 125 activates the A3 AND circuit portion of A0 AND circuit set 128 passing the frame address on cable 85 to register 123. It should be appreciated that the frame address for storing pointer 1 in memory 81 is different than the frame address for storing pointer 2 in memory 82. Hence, registers 122 and 123 now contain the frame address of the two pointers for error correction purposes; OR circuit 129 passes the P2 signal from line 125 to activate register 123 in the same manner that P1 activated register 122.

Simultaneously to the above-described action, the gate pointer signal on line 109 from pointer control circuits 56 goes to both circuit portions 120 and 121 for gating the registers 122 and 123 stored pointers to error correction circuits 68. The A3 AND circuit portion of all AND/OR circuits 133 through 140 inclusive in circuit portions 121 pass the frame address signals in registers 122 and 123 to error correction circuits 68 as frame addresses for use in identifying the byte in error for the code words being processed. These can be steady-state signals to error correction circuits 68 activated during the entire error correction cycle. Alternatively, such readout can be scanned by an intermediate cycle for storage in the error correction circuits 68. In the illustrated embodiment, the continuous signals are used. Therefore, during the correction of the first code word, the frame address for each of the first and second pointers is transferred to error correction circuits 68.

When circuits 84 transfer pointer signals to circuits 68 for execution of steps 15 and 16 of FIG. 1, the frame address of the pointers in memories 81, 82, and 83 all are transferred to the pointer gating circuits 84, as above described. The memory 83 pointer transfer is effected by the P3 indicating signal on line 141. This signal activates register 142 of pointer gating circuits 84 to receive the frame address signals from cable 85. Hence, at the completion of analysis of the first code word, register 122 contains the frame address of pointer $i-1$, register 123 contains the frame address of pointer $i$, while register 142 contains the frame address of pointer $i+1$. The three frame addresses stored in these registers are selectively gated through portions 120 and 121 by the signals, respectively, received from pointer control circuits 56 over lines 112 and 116. The line 112 signal gates pointers 2 and 3, respectively, as first and second pointers activate the A2 AND portions of each of the AND/OR circuits 133-140. As above described, this occurs during the initial double-error correction cycles for correcting the bytes in error in code words 0-5, as shown in FIG. 5. The error correction circuits, at the completion of the correction of code word 5, detect only one byte in error in code word 6. It, therefore, ignores the pointers as described in U.S. Pat. No. 3,629,824 and further supplies the S1=S2T$^j$ signal on line 113 to reset error delimit latch 110. At this time, AND 111 is disabled dropping the gates 2 and 3 pointer signal on line 112 and simultaneously activating AND circuit 115 to supply a continuous gate 1+2 signal over line 116. This activating signal enables the A1 AND portion of each of the AND/OR circuits 133-140 to pass the frame addresses stored in registers 123 and 142, respectively, through circuit portions 120 and 121 as the first and second pointers. Again, circuits 68 ignore the pointers until a double-error situation is detected, as in code word 9, whereupon the first and second pointers correspond to P1 and P2, as above described in the methodology description portion of the application. Upon completion of address cycler 66 stepping through code word F address and the 15th frame address, the signal emitted over line 100 (FIG. 6) toggles SYNCOR latch 65 to the syndrome state and resets memories 81, 82, and 83 to a reference condition, preferably all 0's, as well as resetting the other circuits as above described.

In the event no auxiliary pointers are generated for a single pointer generator, then steps 17 and 18 of FIG. 1 are employed to attempt to generate pointers from the syndromes and correct the errors. It must be remembered that the procedures of steps 17 and 18 are for recovery from a permanent error condition not correctable by any of the steps 13, 14, 15, and 16 of FIG. 1. For this reason, the probability of miscorrection is higher than in any of those previous steps. Accordingly, the verification of data in step 12 becomes more important when employing the following described aspects of the invention. This portion of the invention employs characteristics of the subfield codes described by Patel, supra. Interlacing of data is as above described. The interlaced degree, i.e., the number of frames (in this case, 15) is correctable by the procedure set forth for steps 13, 14, and 15. This portion of the invention enables the correction of 2N-R bytes, wherein N is the number of frames and R is the number of code words having but a single error requiring that R be at least 1. The run of single errors of one or more bytes is used as a delimiter for the burst error and for defining the $i-1$, $i$, and $i+1$ frames in error. Remember, error correction circuits 68 can identify the error location and error pattern of a single byte in error. Referring back to FIG. 5, code words 6, 7, and 8 have but a single byte in error in the fourth frame, which is the ith frame. Error correction circuits identify frame 4 as being the ith frame using the techniques as fully described in U.S. Pat. Nos. 3,629,824 and 3,745,528. Accordingly, the code words are scanned from 0-F looking for a code work having single symbol in error. Hence, in the first scan of code words 0-5, the location of the error is not known, it only being known that there is more than one symbol in error. At code word 6, error correction apparatus 68 detects a single symbol in error and, hence, identifies, for the first time, the location of a byte in error as being in frame 4 ($4=i$). Single error correction proceeds in accordance with step 13 until code word 9 is encountered, at which there is a plurality of symbols in error. At this time, it is assumed that the $i-1$ and $i$ frames are in error; i.e., the invention assumes that there is a continuous burst of errors which does not overlap in more than two frames. Accordingly, in accordance with the invention, frames 3 and 4 are respectively the $i-1$ and $i$ frames in error, respectively generating the first and second error location pointers. Double-error correction proceeds through code word F. At this point, code words 0-5 are yet to be corrected. A third cycle of correction is then entered for correcting code words 0-5 at which point the correction of data is verified in step 12. It is immediately apparent that two correction cycles are required for implementing the recovery procedures of steps 17 and 18. Accordingly, AND circuit 145 of FIG. 6 is interposed between address cycler 66 and the circuit is actuated or cleared by the signal on line 100. AND circuit 106 is disabled prior to completion of the correction cycle for permitting a plurality of successive correction cycles as hereinafter described during the first correction cycles, as shown in FIG. 12. It is not known where the pointer limits are; i.e., it is not known which code words have two errors and which code words have but a single error. Accordingly, two correction cycles are employed in practicing the present invention with the apparatus of Patel, supra. If pipelined arrangements for error correction circuits 68 and additional control circuits are employed, a single correction cycle could be utilized; such enhancement is beyond the scope of the present description, but remains within the inventive concept of the invention.

Error detection and correction circuits 68 in the syndrome generation phase determine the number of errors, i.e., 0, 1, 2, or uncorrectable, and also, in code word 0 of the first correction cycle, ascertain whether or not there are sufficient auxiliary pointers to enable error correction in accordance with step 14.

At the end of the syndrome phase, the error correction circuits have determined whether or not pointers are needed, as indicated by a signal on line 80. Pointer counter 91 of FIG. 9 signifies the number of pointers actually received for the field of data being examined. Hence, at the end of the syndrome phase, it can be determined which step 13, 14, 15, or 17 needs to be performed during the error correction cycle. If mode latch 107 is set, i.e., there are three pointers, then steps 15 and 16 are employed, respectively, during first and second correction cycles. If there are k=0 or k=1 pointers, the signals from pointer counter 91 pass through OR circuit 150 to pointer gating portion 105. Inverter 151 supplies a NOT signal to AND 108 for activating a signal on line 109. Then, correction can proceed according to process step 14 of FIG. 1. It should be remembered that if there are zero or one error, error correction circuit 68 ignore the pointers. If there are two or more errors and insufficient pointers, AND circuit 152 responds to the need-pointers line 80 signal and the K=0,1 signal from OR 150 to supply a pointer-is-less-than-the-error signal over line 153 to the circuits illustrated in FIG. 11 for attempting error recovery by pointer delimiting. Additionally, the line 153 signal also sets generate pointer latch 154 which signifies to the circuits shown in this specification that a plurality of error correction cycles are to be used for first delimiting the pointers and then completing the error correction based upon the delimited pointers. The GENPTR latch 154 supplies its indicating signal over line 155 to disable AND circuit 106 of FIG. 6. It is seen in FIG. 12 that the GEN-PTR latch is set just prior to code word 0 at the end of the syndrome cycle as at 156. The FIG. 11 illustrated apparatus generates pointers in accordance with steps 17 and 18. In this regard, AND circuit 160 responds to a burst error indicating signal from error correction circuits 68 (indicating all code words in error), plus the GENPTR signal on line 155 to set burst error latch 161. Burst error latch 161 additionally activates single-overlap pointer generating circuits 162 and double-overlap burst error pointer generating circuits 163. Either one or the other of the two circuits is activated depending upon the error pattern detected in code word 0. When the error pattern of FIG. 5 is detected, i.e., code word 0 has two symbols in error, then circuits 163 generate pointers. On the other hand, if but a single symbol in error is detected in code word 0, that indicates a single error overlap as shown in FIG. 5C. In FIG. 5C, the ith frame shows a single error at code word 0, a double error beginning at code word 8 and ending at code word B. For a continuous burst of signals, the i−1 code word is always in error in the single-overlap mode. It is possible that the i+1 frame is in error as indicated by the opposite hatched lines 164. However, the latter is not a continuous burst error in that the serial transmission proceeds from left to right. In such an instance, additional control circuits would be necessary to correct a single-overlap error of the discontinuous type wherein the frames i and i+1 are in error. In the latter situation, the frame i−1 cannot be in error; otherwise, there will be three symbols in error in the code words 8-B. In any event, circuits 162 operate with the single overlapped error shown in 5C in areas 165 whereas circuits 163 generate pointers in the FIG. 5 illustrated error pattern. Both circuits 162 and 163 require but a single error to occur for identifying the ith frame in error.

The need-pointer signal on line 80 signifies that the error is greater than the correction capability of the error correction code for performing error correction in step 13 of FIG. 1. A single-overlap error is initially detected as a single symbol in error in code word 0. To detect this error, circuits 162 have AND 166 responding to the burst error latch 161 being set, the error pattern of code word 0 not needing pointers (as indicated by the output of inverter circuit 167 which receives its input from line 80), and the code word being 0 as indicated by decode circuit 168. AND 166 supplies an activating signal to set single-overlap latch 170 to the active condition, which conditions circuits 162 to generate pointers for a single-overlap condition. Decode 168 receives code word addresses over cable 171 from address cycler 66.

In analyzing operation of circuits 162 with respect to the illustrated FIG. 5C, error 165 single-overlap latch 170 was set at time 172 indicated by the dashed line in FIG. 12. At the end of code word 8, the signal on line 80 switches from a nonactive condition to an active condition, i.e., need-pointer is indicated. This signal activates AND circuit 173 to pass the single-overlap latch 170 signal to set two frame error latch 174. At this time, the latch 174 signal travels over line 175 to the active input portion of register 176 to capture the code word address from cable 171; that is, register 176 can be D-type latches with the line 175 signal being differentiated and connected to the C inputs to capture the code word address 8 in register 176. This signifies the start of necessary double-error correction to be conducted in the second error correction cycle. Upon completion of error correction circuits 68 analyzing the signals at the end of code word B, the last code word has two symbols in error, the signal on line 80 becomes inactive; hence, inverter circuit 167 then supplies an activating signal to AND 177 which passes the line 175 signal to the C inputs of register 178 for storing the code word address received on line 171, which in this case is the C address signifying the end of the double symbol in error overlap. The above-described operation delimits the double symbols in error indicated by the double-headed arrows 178 in FIG. 12.

The single frame in error identification is captured in register 180 of circuits 162. The address 1 of the single error is received over cable 181 from error correction circuits 68 and are applied to the D inputs of register 180. AND circuit 182 responds to the decode 168 C=0 signal received over line 183 and to the single-overlap latch 170 signal to set register 180 to the value i. Additionally, −1 circuit 184 and +1 circuit 185 respectively generate the i−1 and i+1 signals to be stored in registers 186 and 187, respectively. The output signals of registers 185, 186, and 187 are supplied to pointer gating circuits 84 for use in the second correction cycle, as will be described.

At the end of the first correction cycle of code word F, it is desired to reset the GEN-PTR latch 154 of FIG. 9. To this end, as seen in FIG. 11, AND/OR circuit 190 supplies a reset signal over line 191 resetting GEN-PTR latch 154 at time 192, i.e., intermediate the first and second correction cycles as best seen in FIG. 12. First input AND portion A1 of A0 190 receives the line 100 signal and jointly responds to that signal, plus the single-overlap latch 170 signal to reset GEN-PTR latch 154 in the single-overlap pointer generating mode. Similarly, the A2 AND input portion of A0 190 jointly responds to the line 100 signal and double-overlap latch 193 of circuits 163 being set to supply the line 191 reset signal for the double-overlap pointer generating operation.

The second correction cycle for the single-overlap error mode supplies two pointers to error correction circuits 68 for the 8th through the Bth code words as controlled by recycle limit circuit 194. This circuit is activated by the single-overlap latch 170 signal and the address from register 176 supplying a comparator (not shown) to initiate a signal S-to-E on line 195. In a similar manner, the output signal of register 177 supplied to recycle limit signal 174 to a comparator (not shown) deactivates the signal on line 195 to provide an error correction pointer supplying signal coextensive with double-headed arrow 178 of the second correction cycle of FIG. 12. In pointer gating circuits 84, as best seen in FIG. 10, registers 180, 186, and 187 supply their output signals to multiple A0's 126 and 128. The line 195 signal activates the A2 input portion of A0's 126 to pass the signal content of register 186 to the first pointer circuits 120. Simultaneously, the line 195 signal also activates the A1 input portion of A0's 128 to pass the signal content of register 180 to second pointer circuits 121. It should be remembered that error correction circuits 68 can ignore pointers when a single-error condition is detected. For purposes of control, recycle limits 194 limit the signal on line 195 to code words indicated by the boundary conditions of registers 176 and 177 to ensure inadvertent double error correction does not occur. This limiting tends to reduce the number of miscorrections possible.

At the end of the second correction cycle, AND circuit 106 of FIG. 6 being open allows the end-of-cycle signal to be passed to line 100A for resetting the circuits as above described.

To generate pointers for the error condition of FIG. 5, circuits 163 generate pointers during the first correction cycle. The double-overlap error condition is detected by AND circuit 200 jointly responding to the C=0 signal from decode 168, burst error signal from burst error latch 161, and the need-pointer signal on line 80 being active to set double-overlap latch 193 to the active condition. It should be noted that either circuit 162 or 163 is activated, respectively, by setting single-overlap latch 170 or double-overlap latch 193. Double-overlap latch 193 being set conditions AND circuit 201 to pass the line 113 single symbol in error indicating signal to set error burst end latch 202. In the FIG. 5 example, this is done in code word 6, the first code word having a single symbol in error. Latch 202 being set supplies a set signal to register 203 for receiving the code word address from cable 171. It should be noted that the signal content of register 203 is one greater than the last code word having two symbols in error. Upon detection of a single symbol in error, error correction circuits 63 begin error correction in a normal single symbol error procedure. Hence, code words 6, 7, and 8 are single symbol error corrected.

At this time, recycle limit latch 204 remains reset thereby activating AND circuit 205 to supply a pointer gating signal over line 206 in a double-overlap mode condition as signified by the double-overlap latch 193 being set. The signal on line 206 goes to circuits 84 of FIG. 10 to be OR'd with the line 195 signal for passing the $i$ and $i-1$ signals captured, respectively, in registers 180 and 186. To this end, AND 201 not only sends error burst end latch 202, but also supplies its setting signal to the C inputs of registers 180, 186, and 187 to capture the $i$ signal from circuits 68, as previously described for the single-overlap error condition. It should be noted that the ith position of the single symbol in error is not known until analysis of the 6th code word; hence, it is not known in code words 0-5 which two symbols are in error, thus requiring two error correction cycles. However, the two symbol in error code words following the single symbol in error code words are identified as the $i$ and $i-1$ code words because of the definition of a single continuous burst error. Hence, all code words 6-F are corrected during the first error correction cycle.

During the second correction cycle, code words 0-5 are double-error corrected at the ith and ith+1 frames. This is achieved by starting the $i$ and $i+1$ error correction by setting recycle limit 204 via AND circuit 208 in joint response to the double-overlap latch 193 signal and the F=0 signal from decode 168. Latch 204 being set supplies its pointer enabling signal over line 210 to pointer gating circuits 84. Line 210 signal travels to the A3 portion of A0's 126 to pass the register 180 i signals to the first pointer circuits 120 and simultaneously activate the A2 portions of A0 128 to pass the register 187 $i+1$ signals to the second pointer circuits 121. Error correction is as described in the above-referenced patents.

To determine the end of the double error correction, compare 211 compares the contents of register 203 with the code words received over cable 171 to reset latch 204 at the end of the 5th code word, thereby removing the enabling signal on line 210 at the end of the 5th code word. Thereafter, the line 206 signal is active to pass the $i$ and $i-1$ pointer signals as above described.

From the above, it can be ascertained that the error correction and the pointer generation can overlap in the first and second correction cycles. Alternatively, all error correction can be done in the second correction cycle. A further alternative is that the output of AND 208 can reset all circuits to the initial condition provided the single and double error correction for the $i$ and $i-1$ frames are completed as first described in this specification. It is preferred, however, that the second error correction cycle run through as indicated in FIG. 12, resetting all circuits at the end of the F code word. In both instances, two correction cycles are desired to be performed for simplifying the circuits involved in generating pointers and correcting the errors in accordance with the code generated pointers.

While the invention has been particularly shown and described with reference to a preferred embodiment thereof, it will be understood by those skilled in the art that various changes in form and detail may be made therein without departing from the spirit and scope of the invention.

What is claimed is:

1. The method of changing error correction apparatus operations for extending correction of data errors wherein the apparatus can correct $k$ errors without auxiliary error location pointers and $k+p$ errors with auxiliary error location pointers, said apparatus generating plural sets of error-indicating syndrome signals, $k$ and $p$ being positive integers, means storing auxiliary error location pointer signals;

including the steps of:

matrix multiplying in said error correction apparatus one set of said syndrome signals until a predetermined relationship exists with another set of said syndrome signals;

during said multiplying, locating and correcting errors in data signals stored in said apparatus according to first error location criteria; and upon detecting said predetermined relationship, locating and correcting data errors according to criteria other than said first error location criteria including using predetermined ones of said stored auxiliary error location pointer signals.

2. The method set forth in claim 1 further, while locating and correcting errors in data signals stored in said apparatus according to said first error location criteria, using a second predetermined one of said stored auxiliary error location pointer signals.

3. The method set forth in claim 2 further including the step of using said first stored auxiliary pointer signal using none of said stored auxiliary pointer signals, and then using second ones of said stored auxiliary pointers wherein at least two of said stored auxiliary pointers are identical.

4. The method set forth in claim 1 further having the steps of:

dividing data and associated check signals into N code words, each code word having M symbols and grouping all like-numbered symbols into error pointing segments, serially transferring said signals as a succession of said segments, M and N being positive integers, monitoring signal transfer and indicating which segments have a given likelihood of error, and identifying such segments as having auxiliary error location pointer, the improved method further including the steps of:

detecting a normally uncorrectable error condition of $k+p$ errors by detecting that other than said $k+p$ number of contiguous segments has said auxiliary error location pointers associated therewith; and then executing the steps set forth in claim 1 for defining the extent of errors as being less than the total number of symbols in said segments indicated as being in error.

5. An error location method having the steps of:

dividing data and check signals into N code words, each code word having M symbols, grouping all like-numbered symbols into error location segments, and serially transferring said signals as a succession of said segments;

M and N being positive integers;

monitoring signal transfer and indicating which segments have a given likelihood of error;

generating error correction signals based on said data and check signals exhibiting a given error correcting capability for correcting errors in a given number of said segments;

the improved method including the steps of:

indicating that said given number plus one of contiguous segments has said given likelihood of error;

generating error syndromes for said given number of segments for each said code word, respectively, based on said data and error correction signals;

error correcting up to said given number of symbols on $i$th+1 symbol of code words in succession using said error syndromes, respectively, until the matrix product of one of said syndromes of a Xth word and the matrix ($T^i$) equals a second one of said syndromes;

where $i$ represents an ith segment in error, X and $i$ are positive integers; and error correcting up to said given number of symbols in said kth-Nth code words by correcting said ith and $i$th−1 symbols therein.

6. For use in a serial signal transfer system, the method of recovering data from error conditions apparently exceeding correction capability of error correction (ECC) apparatus, said ECC apparatus capable of correcting $k$ errors in a given code word without auxiliary error location pointer signals and $k+p$ errors in said code word with $k+p$ auxiliary error location pointer signals, data and check signals being a plurality N of M symbol code words interleaved in a plurality of N symbol frames, each code word having one symbol in each frame and one code word being a first code word having a first transmitted symbol in each said frame and a second code word having a last transmitted symbol in each frame;

the improved method including the following steps for correcting $k+p$ actual data errors with other than $k+p$ auxiliary error location pointer signals;

extracting from said ECC apparatus an indication of $k$ symbols in error on more than $k$ errors for each code word;

correcting in said ECC apparatus all code words having $k$ symbols in error, identifying the frame having the $k$ symbols in error; and correcting all other code words in said ECC apparatus as having $k+p$ symbols in error such that said $p$ symbols in error reside in symbol frames contiguous with frames having said $k$ symbols in error.

7. The method set forth in claim 6 wherein a code word X being one of said code words having $k$ symbols in error has symbols in error in an ith frame, $i$ and X being positive integers;

further including the steps of:

correcting any code words having $k+p$ errors and disposed between first code word symbols and said code word X symbols as having errors in $-i$ and $i+1$ frames, said $i+1$ frame being transmitted after said ith frame; and correcting any code word having $k+p$ errors and disposed between code word X symbols and said last code word symbols as having errors in an ith and $i-1$ frame, symbols in said $i-1$ frame transmitted before symbols in said ith frame.

8. Error bound detector apparatus for defining error bounds in a data signal set having N symbol signals in N code words interleaved in M frames including in combination:

means indicating a general location but not precise extent of a burst of data signal errors;

means dividing said general location in $k+p+1$ error location portions, $k$ and $p$ being positive integers, each portion having N symbol signals from N code words, respectively, N is a positive integer, each code word having M symbols, respectively, in M frames, said $k+p+1$ portions being frames having symbol errors;

pointer means supplying error location pointer signals identifying said $k+p+1$ portions;

means generating a plurality of error indicating syndromes;

means applying multiple error correcting procedures to data signals in $i$ and $i$th+1 ones of said error location portions using at least one of said error indicating syndromes, $i$ being a positive integer less than N;

means forming the product $t^i$ with said one syndrome wherein $t^i$ is a predetermined error matrix related in a predetermined manner to said error correcting procedures of said applying means for said ith error location portion; and means comparing said error product with another of said error indicating syndromes and supplying an equal signal indicating one end of said burst of error signals.

9. The error bound detector apparatus set forth in claim 8 wherein said general error location indicating means includes:

an error location portion counter receiving error pointing signals and counting up to K error pointers wherein K is a positive integer of magnitude greater than $k+p$;

a mode latch indicating that said counter has counted to K;

an error delimit latch receiving said equal signal and indicating one end of said burst of error signal;

means for storing said error location pointer signals in accordance with the frame associated with said error location pointer and in accordance with the present count in said counter; and gating means responsive to said error delimit latch to gate stored error location pointer signals from said ith and ith+1 error location pointers until said latch is set by said equal signal, and then gating pointers from said ith and ith−1 error locations, and including means for degating said ith and ith+1 error location pointers.

10. Error bound detector apparatus set forth in claim 8, further including in combination:

gating means for each data set responsive to said comparing for selectively gating said $k+p+1$ error location pointer signals to said applying means;

means not having supplied said equal signal to supply first set $k+p$ ones of said error location pointer signals and further responsive to having received said equal signal to supply a second set of $k+p$ error location signals, one of said error location pointer signals in each said sets being different.

11. Error location apparatus operable with error detection and correction (ECC) apparatus capable of correcting $k$ errors without auxiliary error location pointers and $k+p$ errors with $k+p$ auxiliary error location pointers, the ECC apparatus indicating uncorrectable errors, or need auxiliary pointers, upon detection of predetermined data error conditions and indicating a predetermined relationship of need error syndrome, $k$ and p are positive integers, means supplying auxiliary pointers for a predetermined set of data and check signals;

the improvement including in combination:

pointer control circuits including a counter to count received auxiliary pointer signals;

memory means having a plurality of storage locations for storing received pointer signals for a given set of data and check signals;

gating means in said pointer control circuits responsive to said counter to gate received auxiliary pointer signals to said memory means for storage at predetermined ones of said storage locations in accordance with a count in said counter;

an address cycler indicating relative signal location in a set of said data and check signals;

said memory means responsive to said address cycler to select storage locations in accordance therewith such that said auxiliary pointer signals are stored at storage locations predetermined by both said address cycler and said counter;

a mode latch in said pointer control circuits responsive to said counter to indicate more than $k+p$ received auxiliary pointer signals; and delimiting means in said pointer control circuits responsive to said mode latch and to said ECC apparatus indicating said predetermined relationships of said error syndromes to actuate said memory means to supply predetermined ones of said auxiliary pointer signals from some of said predetermined storage locations to said ECC apparatus for error correction of data signals.

12. The method of correcting errors in a set of data signals having an error correction capability of $k+p$ error correction wherein K and p are integers and $k$ indicates symbol correction capability without auxiliary pointers and $k+p$ indicates correction capability with auxiliary pointers, generating auxiliary pointers, the steps of:

detecting the number of errors $j$ in said data signals, comparing the number of detected errors with $k$ and $k+p$, generate plural sets of syndrome signals;

when $j \leq k$, locate and correct errors;

when $k < j \leq k+p$ and the number of said auxiliary pointers equals $k+p$, locate and correct errors using said auxiliary pointers;

when $j > k$ and the number of said auxiliary pointers does not equal $k+p$, delimit the error bounds as follows:

matrix multiply one set of said syndrome signals until a predetermined relationship exists with another set of said syndrome signals;

during said multiplying, locating and correcting errors in said data signals according to first error location criteria; and upon detecting said predetermined relationship, locating and correcting data errors according to criteria other than said first error location criteria including using predetermined ones of said auxiliary pointer signals.

* * * * *